April 16, 1963  E. SALMIVUORI  3,085,766
SPINNING TYPE FISHING REEL
Filed March 11, 1959  6 Sheets-Sheet 1

ERKKI SALMIVUORI
INVENTOR.

BY
Eugene C. Knoblock
ATTORNEY

April 16, 1963  E. SALMIVUORI  3,085,766
SPINNING TYPE FISHING REEL
Filed March 11, 1959  6 Sheets-Sheet 2

ERKKI SALMIVUORI
INVENTOR.

BY Eugene C. Knoblock
ATTORNEY

April 16, 1963 E. SALMIVUORI 3,085,766
SPINNING TYPE FISHING REEL
Filed March 11, 1959 6 Sheets-Sheet 3

ERKKI SALMIVUORI
　　　　INVENTOR.

BY Eugene C. Knoblock
　　　　ATTORNEY

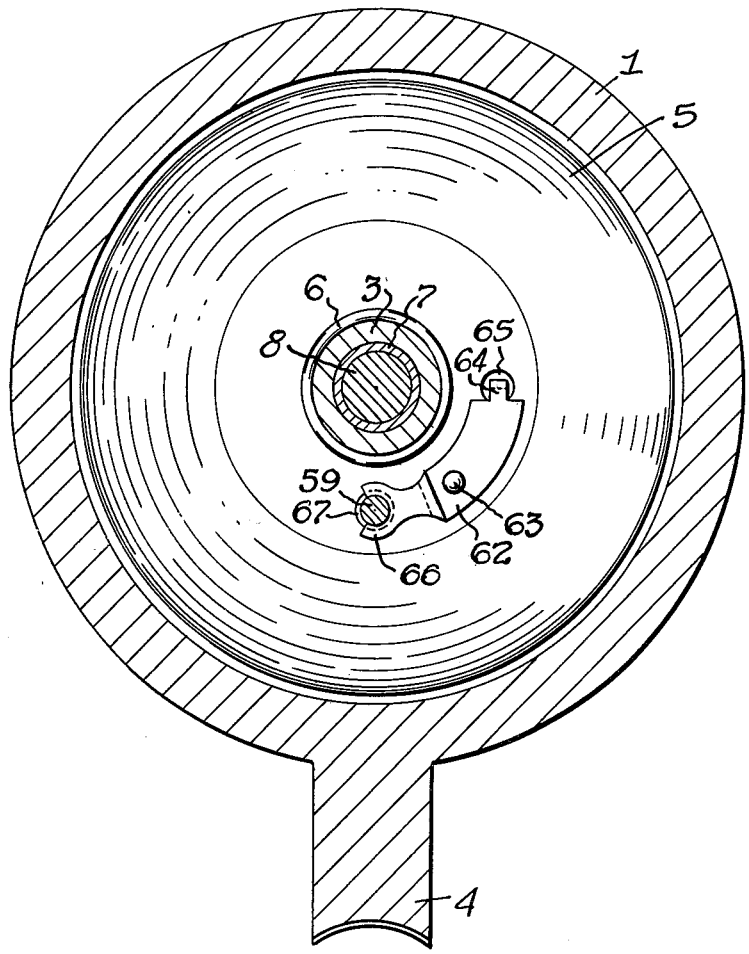

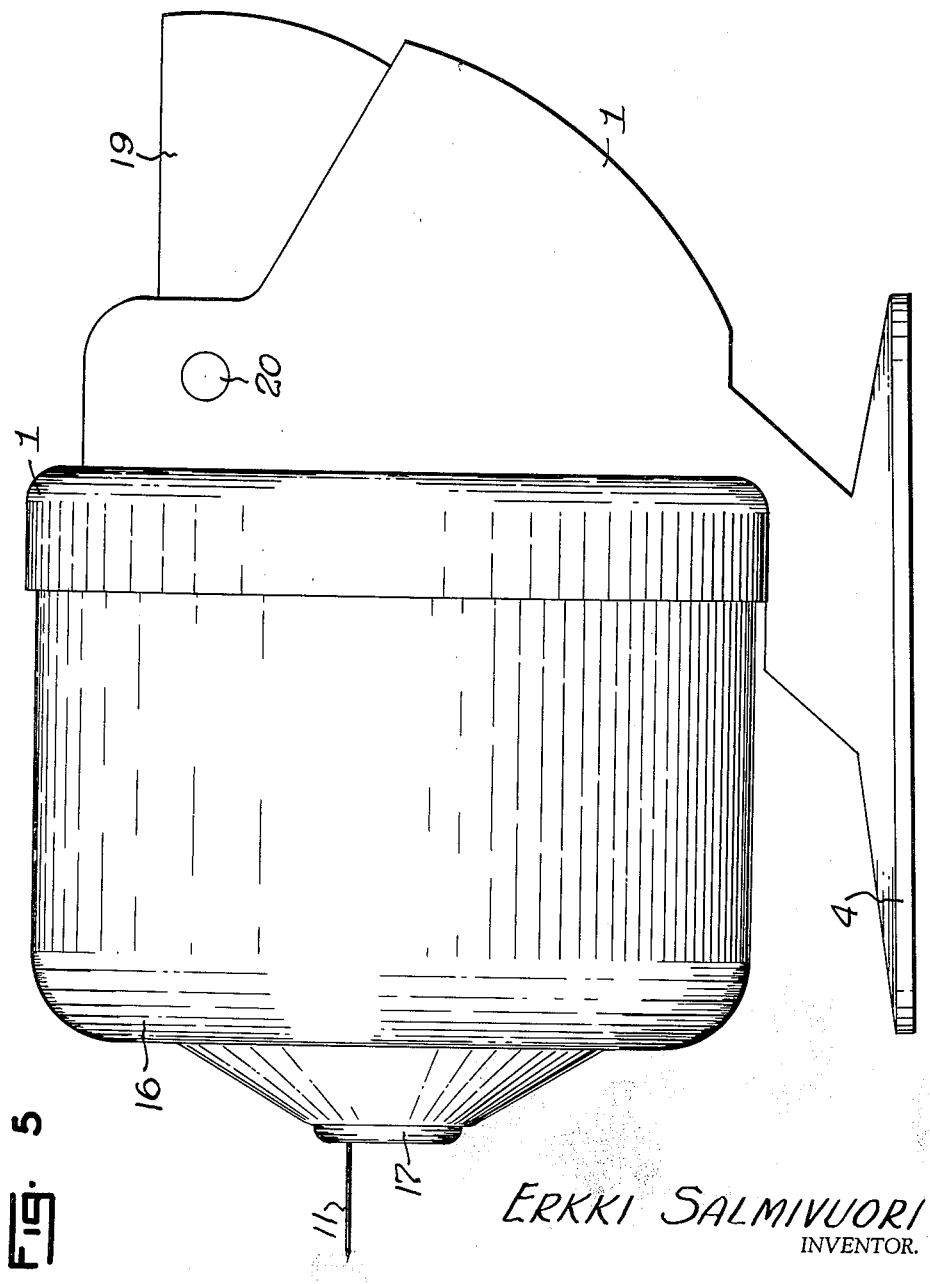

April 16, 1963 E. SALMIVUORI 3,085,766
SPINNING TYPE FISHING REEL
Filed March 11, 1959 6 Sheets-Sheet 6
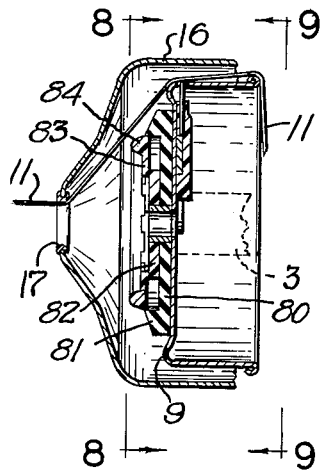
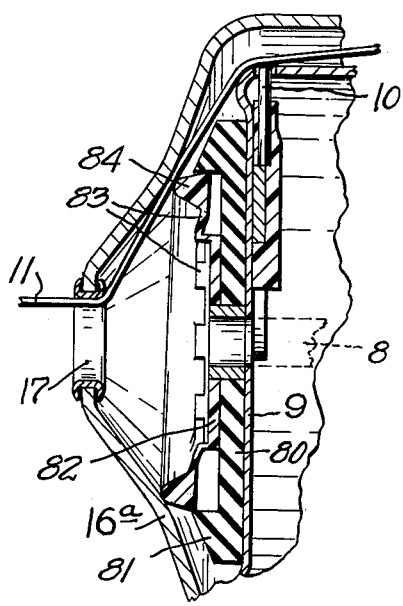
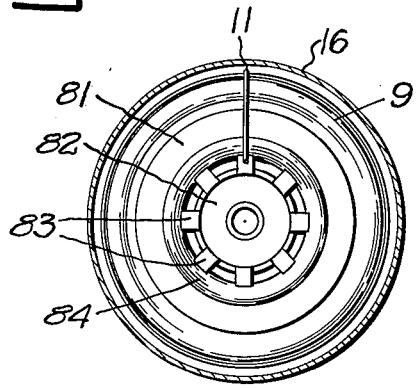
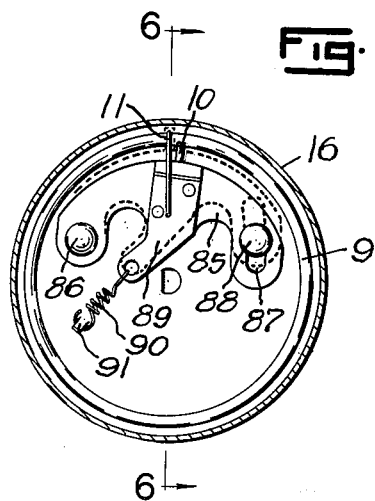
INVENTOR.
ERKKI SALMIVUORI
BY
Eugene C. Knoblock
ATTORNEY

United States Patent Office 3,085,766
Patented Apr. 16, 1963

3,085,766
SPINNING TYPE FISHING REEL
Erkki Salmivuori, Malmo, Sweden, assignor to Fishing Tackle Company of America, Spencer, Iowa, a corporation of Iowa
Filed Mar. 11, 1959, Ser. No. 798,732
3 Claims. (Cl. 242—84.21)

This invention relates to improvements in fishing reels of the spinning type. More particularly, the invention relates to a reel having a spool from which line is discharged in a direction axially of the spool when casting and onto which line is wound by rotating a pick-up mechanism which carries the line around the spool while the spool is held against rotation.

The primary object of this invention is to provide a novel, simple, inexpensive, trouble-free reel of this character.

A further object is to provide a reel of this character having a novel construction of friction clutch interposed in the driving mechanism of the device.

A further object is to provide a reel of this character having a novel arrangement of drag washers actuable to apply drag of adjusted value and having audible signalling means indicating the functioning of the drag.

A further object is to provide a reel of this character having a line-braking device, permitting a clamping action on the line during the first part of the forward whip of the casting operation and also a light braking or feathering of the line during the casting operation.

A further object is to provide a reel of this character having a spool rotatably mounted on a sleeve and retained thereon by suitable retaining means, wherein said sleeve is reciprocated endwise upon a support by means attached to a reciprocating level line member for shifting said sleeve and spool in an axial direction, and wherein releasable friction clamp means interconnect said spool and level wind member to retard rotation of the spool relative to its mounting sleeve.

Other objects will be apparent from the following specification.

Figure 1:
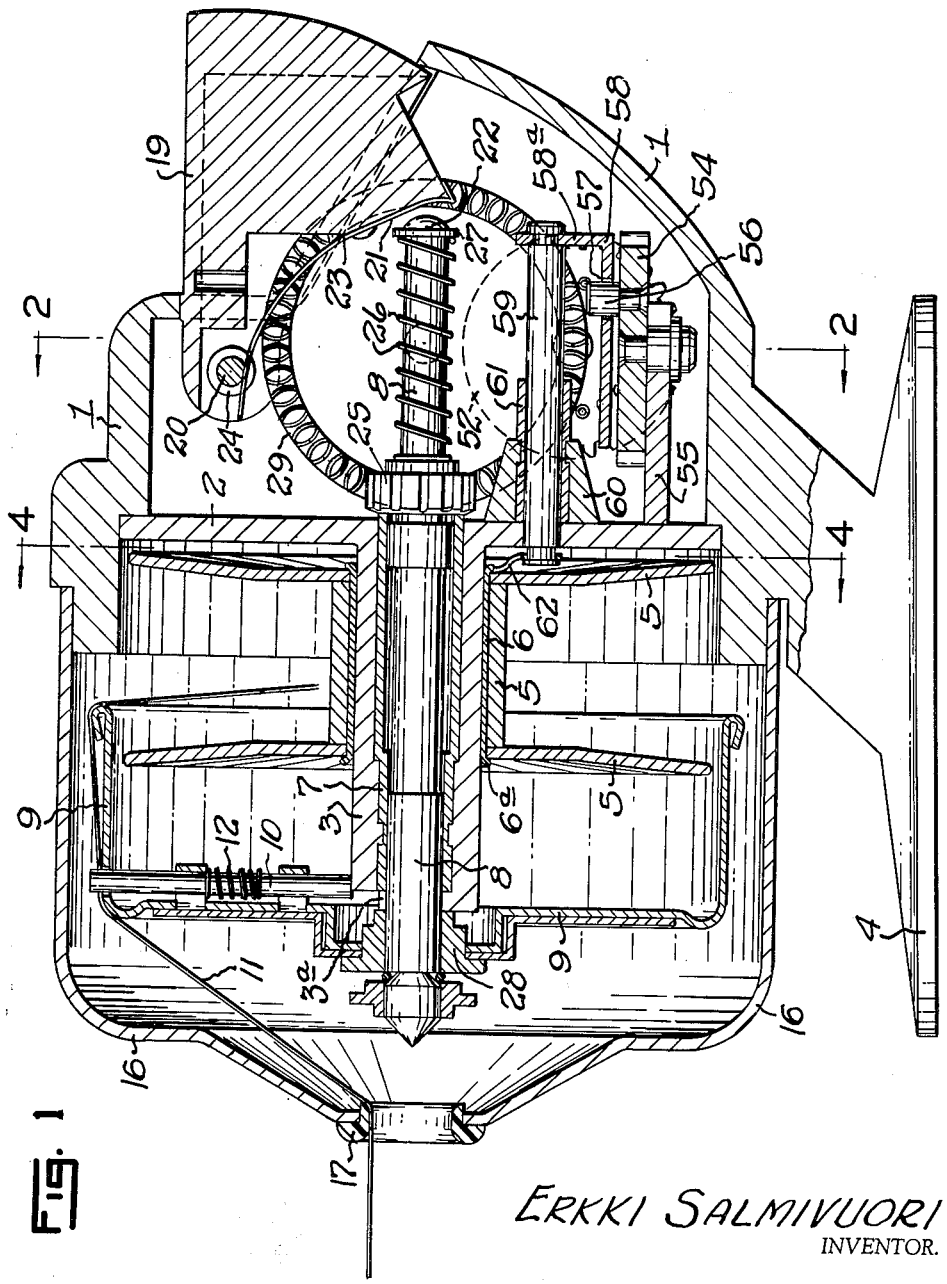
Figure 2:
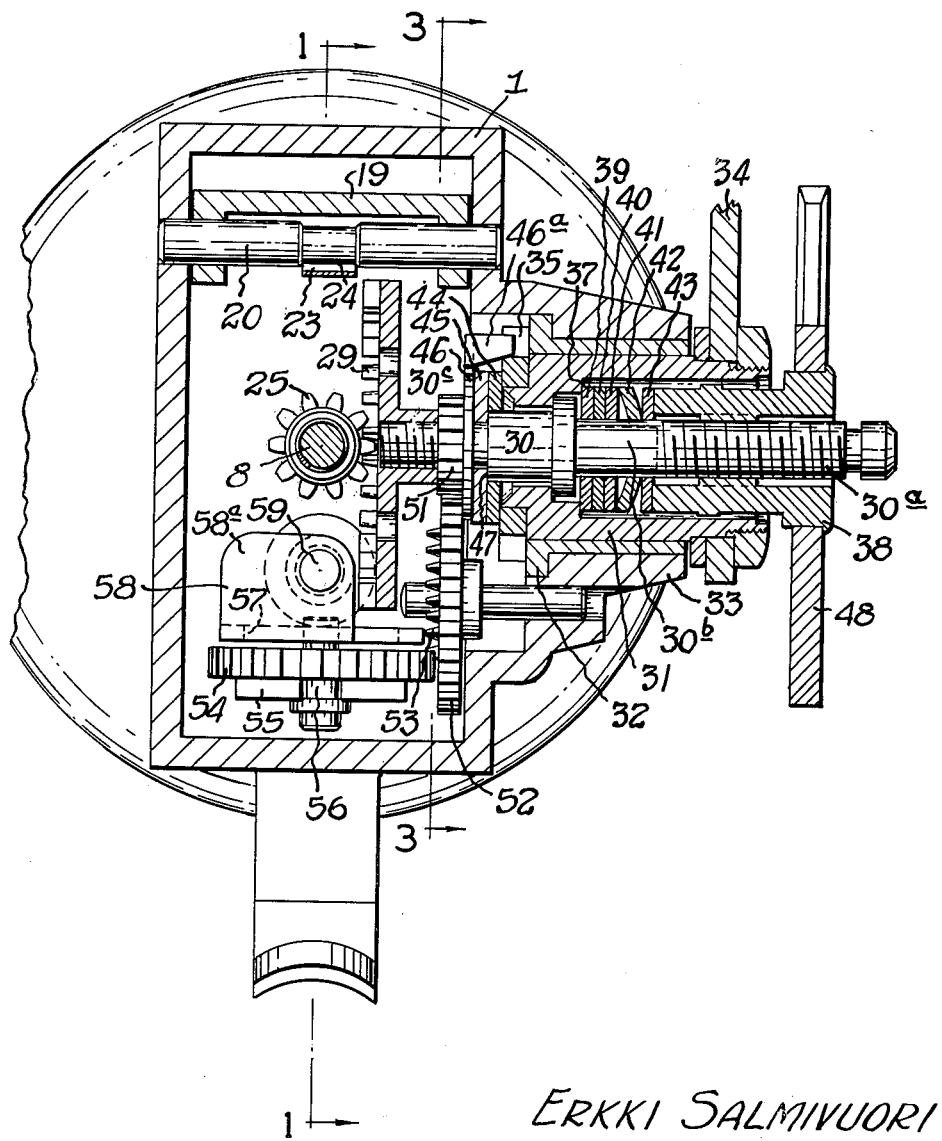
Figure 3:
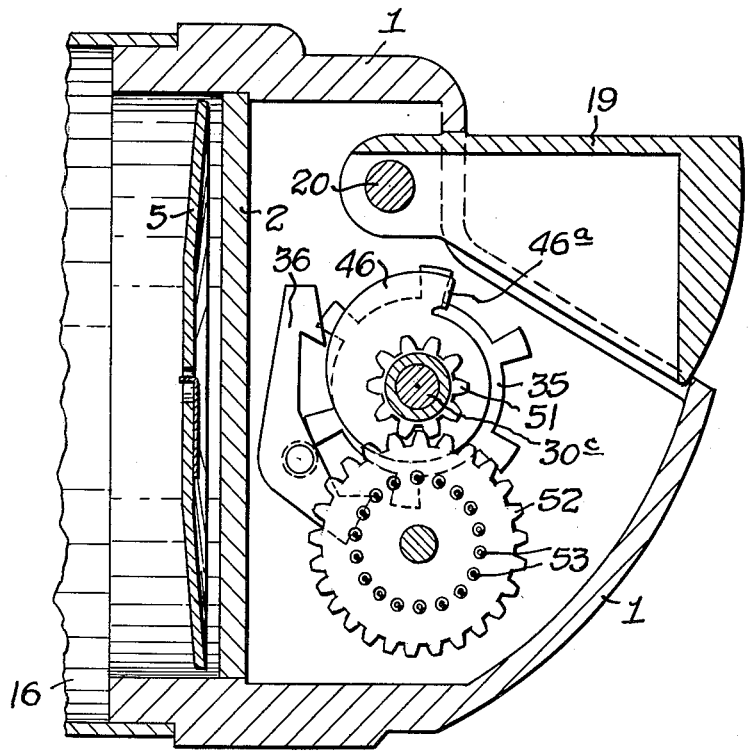

In the drawings:
FIG. 1 is an axial sectional view of the reel taken on line 1—1 of FIG. 2;
FIG. 2 is a transverse sectional view of the reel taken on line 2—2 of FIG. 1;
FIG. 3 is a fragmentary sectional view taken on line 3—3 of FIG. 2;
FIG. 4 is a transverse sectional view taken on line 4—4 of FIG. 1;
FIG. 5 is a side view of the reel;
FIG. 6 is a fragmentary axial sectional view of a modified embodiment of the invention taken on line 6—6 of FIG. 9;
FIG. 7 is an enlarged fragmentary sectional view illustrating the line-feathering means in use;
FIG. 8 is a transverse sectional view taken on line 8—8 of FIG. 6;
FIG. 9 is a transverse sectional view taken on line 9—9 of FIG. 6.

Referring to the drawings which illustrate the preferred embodiment of the invention, and particularly to FIGS. 1, 2, 3 and 4, the numeral 1 designates a gear box or housing forming the rear part of the reel and open at its front and also being provided with an opening in the top rear portion thereof. A plate 2 fits in the front open portion of the reel housing 1, extending transversely thereof and bearing upon an internal shoulder in said housing. A cylindrical bearing is carried by and projects forwardly from the plate 2 and is centered relative thereto. The housing 1 has a foot or base plate 4 adapted to bear against a rod or reel seat of a rod and to be locked in operative position thereon by means well understood in the art.

A spool 5 having a cylindrical hub portion and a pair of spaced circular end plates encircles the cylindrical bearing member 3. A sleeve or bushing 6 is slidable upon the bearing 3 and slidably mounts the hub portion of the spool 5. The spool 5 is assembled as a unit with the sleeve 6 by any suitable retainer means, here illustrated as outturned circular flanges 6a on the opposite ends of the sleeve 6.

The bearing 3 is substantially tubular, having an axial bore therethrough which is lined by a bushing 7. A main shaft 8 is rotatable in the bushing 7 and is of a length greater than the length of the bushing 7 and the bearing 3 and projects from both ends thereof as seen in FIG. 1, so that the rear end of the shaft 8 projects into the gear box at the rear of the reel, and the front portion of the shaft 8 projects forwardly of the bearing 3.

A cup-shaped member 9, constituting a pick-up housing is fixedly secured on the shaft 8 in any suitable manner, so as to rotate with the shaft 8. The cup-shaped part 9 has an inner diameter greater than the diameter of the end plates of the spool so as to fit therearound. The front or transversely extending portion of the pick-up housing carries suitable guide means for slidably mounting a pick-up part 10 which may be a pin of a length to project through a suitable opening in the cylindrical portion of the cup-shaped part 9 aligned therewith when the inner end thereof bears against the bearing 3. The bearing 3 is preferably provided with a cam surface 3a at its forward end to guide the pick-up pin 10 from a retracted position to which it is urged by a spring 12 to the projecting position shown in FIG. 1 incident to rotation of the pick-up housing for the purpose of retrieving the line 11 engaged by the pin 10 when in the extended position shown in FIG. 1. When the pin 10 is retracted by the spring 12 into the housing 9, the line 11 is free to spin off of the spool 5 without interference.

A cover 16 substantially cup-shaped is detachably mounted upon the outer portion of the open end at the front of the gear box 1 and substantially concentric with spool 5 and the housing 9. The cover 16 has a central hole provided with a wear guide ring 17 to accommodate discharge of line 11 from the reel in a substantially axial direction and with minimum resistance or wear. It will be understood that monofilament line is usually employed upon reels of this character.

The main shaft 8 with the pick-up housing 9 mounted thereon is slidable endwise in the bushing 7. Consequently, the pick-up housing 9 may be moved forwardly during casting to provide the dual function of disengaging the inner end of the pick-up pin 10 from the bearing 3 and to brake the pay-out of the line 11 by pressing said line between the inside surface of the front of the cover 16 and the outside surface of the front portion of the pick-up housing 9. The endwise movement of the shaft 8 is produced by any suitable means and, as here shown, is produced by means of a push-button 19 pivoted upon a shaft 20 transversely of the gear housing 1 in such a position that said push button 19 extends through an opening at the rear of the gear housing 1. The push button 19 has a cam surface 21 at its front inner lower face portion aligned with the shaft 8 and engageable with a rounded or part-spherical end portion 22 of the shaft 8. A leaf spring 23 is carried by the push button 19 and preferably provides the cam surface 21. The leaf spring 23 projects forwardly and upwardly from the front lower free end portion of the push button 19 and bears against the bottom portion of the pivot shaft 20 and seats in a circumferential groove 24 in said shaft 20 to align the parts and retain the pivot shaft 20 releasably. Release of the pin 20 can be accommodated by flexing the free end of the leaf spring 23 to disengage the shaft 20 whereupon said shaft may be pulled endwise to accommodate release of the push button 19. Release of the push button opens the gear box for inspection and accommodates adjustment and lubrication of the parts in the gear box.

The rearward projecting portion of the shaft 8 adjacent to the transverse plate 2 mounts a gear or pinion 25 which is splined or otherwise mounted thereon to accommodate longitudinal movement of the shaft 8 relative to the gear 25 without relative rotation between said shaft 8 and gear 25. A coil spring 26 encircles the rear portion of the shaft 8 and bears at its front end upon the pinion 25 to maintain the same in engagement with a fixed part associated with the transverse plate 2 such as a rear projecting portion of the bushing 7, as illustrated in FIG. 1. The rear end of the coil spring 26 bears against a retainer ring 27 mounted upon the shaft 8.

In the normal position of the parts the spring 26 urges the shaft 8 to its rearmost position, as illustrated in FIG. 1. This position is determined by the engagement by a bushing or abutment 28 carried by the pick-up housing 9 with the front end of bearing 3.

The gear or pinion 25 meshes with a main gear 29 screw-threaded or otherwise secured upon a shaft 30 extending radially of the main shaft 8. The gear shaft 30 is rotatably mounted within the axial bore of a tubular crank shaft 31. Tubular crank shaft 31 is journaled in a crank bushing 32 fixed in a tubular boss or projection 33 of the gear box 1. A crank 34 of any suitable character is fixedly mounted upon the outer end of the tubular crank shaft 31.

Means are provided to prevent rotation of the gear shaft 30 in one direction. Likewise, the shafts 30 and 31 are provided with a friction drag or clutch so that an operator can crank in the line when the drag is set only with a force determined by the drag setting, and exertion of a greater force results in lost motion between the shafts and consequently lost motion between the crank 34 and pick-up member 9.

The anti-reverse, as here illustrated in FIG. 3, constitutes a toothed washer 35 securely mounted upon the inner end of the tubular shaft 31 in fixed non-rotating relation to said shaft 31. A ratchet member 36 is pivoted to the gear housing 1 for engaging the teeth of the toothed washer 35. The toothed end portion of the ratchet 36, shown in the upper part of FIG. 3, prevents clockwise rotation of the toothed washer 35 and associated tubular shaft 31, as viewed in FIG. 3, but accommodates counter-clockwise rotation thereof. If desired, the ratchet may be pivoted intermediate its ends and may have a toothed portion at its opposite end which may likewise engage the teeth of the washer 35 and accommodate counter-clockwise rotation of the washer 35, as viewed in FIG. 3, and prevent clockwise rotation of said washer.

The reel is provided with a friction drag of adjustable character, and the preferred construction of this drag is illustrated in FIG. 2. The drag preferably consists of a plurality of washers received within the bore of the tubular shaft 31 and mounted upon a portion 30b of the shaft 30 therein between an internal shoulder 37 in said tubular shaft 31 and the inner end of an internally threaded drag nut 38 which is screw-threaded upon the outer threaded end portion 30a of the gear shaft 30. As here illustrated the washers include an inner washer 39, a friction washer 40, which may be made of plastic, a flat metal washer 41, a bent spring washer 42, and a flat metal washer 43, arranged side by side and preferably in the order mentioned reading from inner to outer washer. The gear shaft 30 preferably has a flat portion 30b and washers 41 and 43 have openings therethrough of non-circular shape providing portions bearing against said flat shaft portion 30b, so that said washers 41 and 43 are locked on the gear shaft 30. The inner washer 39 is preferably made of steel or other metal having a concentric annular series of teeth projecting from each face thereof and engaging shoulder 37 of the tubular shaft 31 at one face thereof, and engaging the friction washer 40 at the opposite face thereof, to tend to transmit rotation of the tubular shaft 31 to the friction washer 40. Thus the washers 40 and 41 constitute frictionally engaging drag-defining parts of clutch members.

The shaft 30 projects inwardly beyond the inner end of the tubular shaft 31, and the inwardly projecting end of shaft 30 mounts a friction washer 44 rotatable on shaft 30 and confronting the toothed washer 35 adjacent thereto. A flat metal washer 45 encircles shaft 30 and confronts the inner face of the friction washer 44, and a spring metal washer 46 bears against the inner face of washer 45. Washers 45 and 46 have holes with flat sides corresponding with flat surface 30c on the gear shaft 30. The gear shaft 30 is reduced at its inner end to provide a shoulder 47 against which washer 45 is pressed in the normal arrangement of the parts. The metal washer 46 is a spring washer having a long spring arm 46a bent therefrom and engageable with the teeth of the washer 35 when the drag is functioning. Relative rotation of the spring washer 46 and the toothed washer 35 produces a clicking sound which is readily audible.

It will be evident that friction of the drag can be adjusted by turning the drag nut ring or actuator 48 carried by the drag nut 38 in either direction upon the gear shaft 30 for the purpose of changing the tension of the spring washer 42.

A gear or pinion 51 is mounted on the flat part 30c of the gear shaft 30 between the spring washer 46 and the hub of the gear 29. The gear 51 serves as a means for actuating a level wind mechanism. As here illustrated, the level wind mechanism includes a gear 52 meshing with gear 51 and provided with annular series of laterally projecting teeth 52 projecting from the inner face thereof, said gear 52 being suitably journaled in the gear box 1 on an axis parallel to the shaft 30. A gear 54 having its axis perpendicular to the axes of shafts 8 and 30 meshes with the teeth 53 of gear 52. The gear 54 is rotatably carried by a bracket 55 or other support member preferably carried by and projecting rearwardly from the plate 2.

Gear 54 carries eccentrically projecting at its upper face a pin or boss 56 which projects into an aperture 57 of a cam plate 58. The cam plate 58 has an ear 58a which is secured to the free end of a pin or rod 59. Rod 59 is positioned parallel to shaft 8 and is axially slidable in a bushing 61 carried by a boss 60 projecting rearwardly from the plate 2. Rod 59 extends through the plate 2 and terminates forwardly thereof, as at a circumferentially grooved end portion 67.

The front end of the rod or pin 59 is connected to the spool 5 detachably. One construction accommodating such attachment is illustrated in FIG. 4 and entails the provision of a spring plate or clamp 62 which preferably is riveted at 63 to the adjacent end plate of the spool intermediate its ends. One end of the plate 62 may be provided with a tab 64 bent perpendicularly therefrom to extend through a hole 65 formed in the end wall of the spool for the purpose of positioning the plate 62. The opposite end 66 of the spring clamp is forked for detachable engagement with the grooved end 67 of the pin or rod 59. The plate 62 is positioned with the forked end 66 extending in the same direction in which the pick-up housing 9 rotates when retrieving line; or, stated differently, as viewed in FIG. 4, the shaft 8 rotates clockwise while retrieving line. Consequently the spool can be removed from the pin or rod 59 by turning the spool 5 in a direction opposite that in which the pull on the line is trying to turn the spool during line-retrieving. The forked end 66 of the spring clamp 62 preferably has a snug fit on the groove portion 67 of the pin 59, as by spacing the inner edges of the free ends of the fork slightly less than the diameter of the pin at the groove 67 so that a snap fit will be provided normally serving to hold the parts assembled and to resist slightly any tendency to disassemble, but said resistance being small enough to be readily overcome by a simple manual rotation of the spool in counter-clockwise direction, as viewed in FIG. 4.

In the use of the reel for casting line 11, the push button 19 is depressed initially to cause the front marginal portion of pick-up housing 9, here shown as being of curved radial outline, into position to clamp the line 9 against the front portion of the cup-shaped cover 16. The forward endwise movement of the shaft 8 produced by depression of the button 19, and the forward movement of the pick-up housing 9, shifts the pick-up part or pin 10 bodily to free it from the tubular part 3 so that the spring 12 is free to retract the pin and thereby release the line 11 so that the latter is free to unwind from the spool 5 and around the pick-up part or cup 9. As the forward whip of the casting operation commences, a slight release of the button 19 frees the clamping action upon the line 11 exerted between the pick-up cup 9 and the cup-shaped cover 16 to the extent desired, so that the line 11 is free to project through the reel to and through the discharge outlet 17 by an action entailing unwinding of the line around the pick-up housing 9. The amount of pressure exerted upon the line is commonly called "feathering" and may be varied during the cast or from one cast to another by a simple control of the button 19.

When the line is to be retrieved, the push button 19 is released so that the spring 26 urges the shaft 8 toward the right, as viewed in FIG. 1, to position the pickup pin 10 in engagement with the cam end portion 3a of the tubular bearing 3. The crank 34 is then rotated to operate the gear train which rotates shaft 8 and the pick-up housing 9. When the pick-up housing 9 starts revolving, the pin 10 moves over the cam surface 3a on the bearing 3 to be projected radially outwardly against the action of the spring 12, and when the pick-up pin 10 is fully projected so as to be free from the shoulder between the cam part 3a and the cylindrical part 3 of the bearing 3, the spring 26 shifts the shaft 8 and the pick-up housing 9 axially toward the right, as viewed in FIG. 1, to permit the inner end of the pick-up pin 10 to ride upon the cylindrical portion of the tubular bearing 3 as long as the spring 26 is free to position the shaft 8 longitudinally without interference from the button 19. The rotation of the crank is transmitted through the drag mechanism and the gears 29 and 25 and also through the level wind mechanism including the gears 51, 52 and 54 and the cam parts 56 and 58. Consequently, as the crank 34 is rotated, the projected pick-up pin 10 engages the line 11 and acts to coil or wind the same upon the spool 5 while the spool 5 is reciprocating axially but non-rotatably. This permits the line to be wound upon the spool evenly. If the tension on the line 11 increases above the amount which the drag mechanism has been set to withstand, which setting will depend in part upon the strength of the line being used, lost motion will occur between the parts 40 and 41 of the friction drag to limit the pull upon the line 11 to the amount which the line will withstand. Lost motion occurs between the drag parts 40 and 41 to limit transmission of rotation between the tubular shaft 31 operated by the crank and the gear mounting shaft 30. Relative rotation therefore occurs between the toothed wheel 35 mounted on the tubular shaft 31 and the washer 46 mounted on the shaft 30 and having arm 46a engaging the teeth of the washer 35 to produce a clicking noise signalling the lost motion existing in the reel between the operating crank and the line-winding pick-up housing 9.

A modified embodiment of the invention entailing an improvement in the line-feathering mechanism is illustrated in FIGS. 6 to 8. In this construction the front face or end of the pick-up member 9 mounts a friction disk 80 which may be formed of rubber or synthetic rubber and is provided with an annular forwardly projecting marginal rim portion 81. A disk 82 is mounted concentrically with rubber disk 80 and pick-up member 9 at the front face of the rubber disk 80. The disk 82 is provided with a plurality of forwardly offset circumferentially spaced radial spider arms 83 normally spaced forwardly from the front face of the member 80, as seen in FIG. 6. An annular marginal portion 84 is carried by the arms 83 and projects forwardly therefrom. The member 82, 83, 84 is preferably formed of a synthetic resin material, such as nylon characterized by a high resistance to abrasion and by flexibility of the arms 83 and the ring 84 thereof. Front wall 16a of the cover 16 is conical and so shaped as to permit engagement thereof by ring part 84 while the front marginal portion of the pick-up member 9 and the marginal portion 81 of the disk 80 remain spaced therefrom. Thus, as line is being uncoiled during casting operation, while the operator is depressing the button 19, the line is brought into engagement with the cover wall 16a and the rim 84. The amount of resistance to line discharge produced by this manipulation depends upon the pressure exerted upon the button 19. As this pressure is increased following initial contact of the line with cover wall 16a and the ring 84, the ring 84 rocks as accommodated by flexure of the arms 83, which rocking occurs progressively around the ring 84 at the portion thereof which engages the line 11 at each instance during the uncoiling of the line from the spool 5 around the pick-up member 9. Exertion of maximum pressure upon the button 19 retracts the ring 84 into the outline of the projecting margin 81 of the disk 80 to permit the line-clamping action to be shared simultaneously by the parts 81 and 84 to produce maximum resistance to line payout.

The construction illustrated in FIG. 9 constitutes a modified embodiment of the mounting for the line pick-up pin 10. In this construction the pin 10 is mounted upon a lever 85 pivoted at 86 to the end of the pick-up housing 9 and provided with a slot 87 at its opposite end receiving a pin 88 carried by the pick-up housing 9. The pin and slot arrangement 87, 88 limits the pivoting of the lever 85 and the extension and retraction of the pin 10 relative to the pick-up housing 9. Lever 85 preferably includes a central cam engaging projecting arm 89 to which is connected the free end of a coil spring 90 anchored at 91 to the pick-up housing 9 and serving to draw the lever 85 in a direction to retract the pin 10 within the outline of the pick-up housing 9.

While the preferred embodiments of the invention have been illustrated and described, it will be understood that changes in the construction may be made within the scope of the appended claims without departing from the spirit of the invention.

I claim:

1. A fishing reel comprising a housing having an aperture; a tubular bearing fixedly carried by said housing substantially aligned with said aperture and having a cylindrical bearing surface and a cam portion; a shaft journaled and slidable endwise in said bearing and spring urged toward a normal longitudinal position in said bearing; a line spool slidable axially on said bearing; a line pick-up member mounted on said shaft and having a part telescopically receiving said spool, said pick-up member being shiftable in said housing to a position to clamp a line between it and said housing; an outwardly projecting line-engaging element carried by said pick-up member and normally engaging the outer cylindrical surface of said bearing; drive means for simultaneously reciprocating said spool, rotating said pick-up member, and projecting said line-engaging element relative to said pick-up member by rotatively advancing it upon said cam portion to said cylindrical bearing surface as said shaft is spring-urged to normal position; means for sliding said shaft to disengage said line-engaging element from said bearing and shift said line pick-up member between its normal longitudinal position and said line-clamping position of said pick-up member; and means for retracting said line-engaging element relative to said pick-up member when said element clears said bearing; a concentric circular line-feathering member carried by the front of said line pick-up member and including an annular forwardly projecting resilient marginal portion formed of abrassive-resistant material engageable with said housing, and an annular friction member carried by said line pick-up member encircling said line-feathering member, the marginal part of the feathering member normally projecting forwardly of the front surface of said annular friction member.

2. A fishing reel comprising a housing having an aperture, a tubular member fixedly carried by said housing substantially aligned with said aperture and having a cylindrical bearing surface and a cam portion, a shaft journaled and slidable endwise in said tubular member and spring-urged toward a normal longitudinal position in said tubular member, a line spool carried by said tubular member, a line pick-up member mounted on said shaft and having a part telescopically receiving said spool, said pick-up member being shiftable in said housing to a position to clamp a line between it and said housing, an outwardly projecting line-engaging element carried by said pick-up member and normally engaging the outer cylindrical surface of said bearing, drive means for rotating said pick-up member and accommodating axial movement thereof to project said line-engaging element relative to said pick-up member by rotatively advancing it upon said cam portion to said cylindrical bearing surface as said shaft is spring-urged to normal position, means for sliding said shaft to disengage said line-engaging element from said bearing and shift said pick-up member between its normal longitudinal position and said line-clamping position, means for retracting said line-engaging element relative to said pick-up member when said element clears said bearing, a concentric circular line-feathering member carried by the front of said line pick-up member and including an annular forwardly projecting resilient marginal portion formed of abrasive resistant material engageable with said housing, and an annular friction member carried by said line pick-up member and encircling said line-feathering member, the marginal part of said feathering member normally projecting forwardly of the front surface of said annular friction member.

3. A fishing reel comprising a housing having an aperture; a tubular bearing fixedly carried by said housing substantially aligned with said aperture and having a cylindrical bearing surface and a cam portion; a shaft journaled and slidable endwise in said bearing and spring-urged toward a normal longitudinal position in said bearing; a line spool slidable axially on said bearing; a line pick-up member mounted on said shaft and having a port telescopically receiving said spool, said pick-up member being shiftable in said housing to a position to clamp a line between it and said housing; an outwardly projecting line-engaging element carried by said pick-up member and normally engaging the outer cylindrical surface of said bearing; drive means for simultaneously reciprocating said spool, rotating said pick-up member, and projecting said line-engaging element relative to said pick-up member by rotatively advancing it upon said cam portion to said cylindrical bearing surface as said shaft is spring-urged to normal position; means for sliding said shaft to disengage said line-engaging element from said bearing and shift said line pick-up member between its normal longitudinal position and line-clamping position, means for retracting said line-engaging element relative to said pick-up member when said element clears said bearing, and a circular line-feathering nylon member concentric with said line pick-up member and housing opening and carried by the front of said pick-up member, said line-feathering member including a central part secured to said pick-up member, an annular marginal portion projecting forwardly and spaced outwardly from said central part, and a plurality of resilient circumferentially spaced substantially radially extending arms connecting said central and marginal portions.

References Cited in the file of this patent
UNITED STATES PATENTS

| | | |
|---|---|---|
| 2,573,240 | Berlinger | Oct. 30, 1951 |
| 2,613,468 | Hand | Oct. 14, 1952 |
| 2,633,308 | Zientowski | Mar. 31, 1953 |
| 2,643,073 | Bourne et al. | June 23, 1953 |
| 2,644,647 | Denison et al. | July 7, 1953 |
| 2,680,575 | Hayes | June 8, 1954 |
| 2,686,016 | Kilian | Aug. 10, 1954 |
| 2,711,292 | Taggart et al. | June 21, 1955 |
| 2,777,645 | Wood | Jan. 15, 1957 |
| 2,828,088 | Denison et al. | Mar. 25, 1958 |
| 2,854,200 | Montgomery | Sept. 30, 1958 |
| 2,859,924 | Sarah | Nov. 11, 1958 |
| 2,862,679 | Denison et al. | Dec. 2, 1958 |
| 2,988,298 | Purnell | June 13, 1961 |